April 12, 1955  T. B. CLINE  2,706,093
SAUSAGE CASING WINDING REEL
Filed Feb. 18, 1954
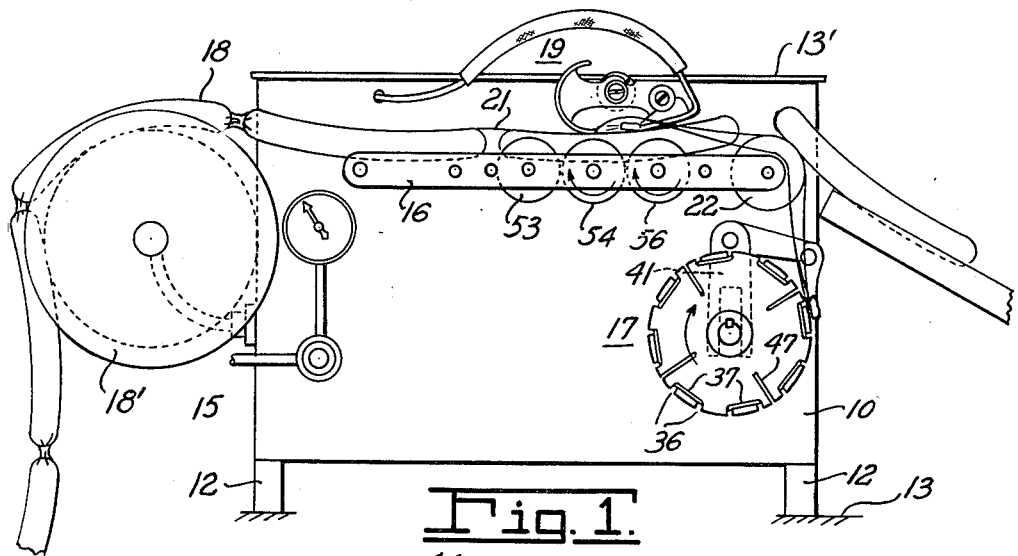
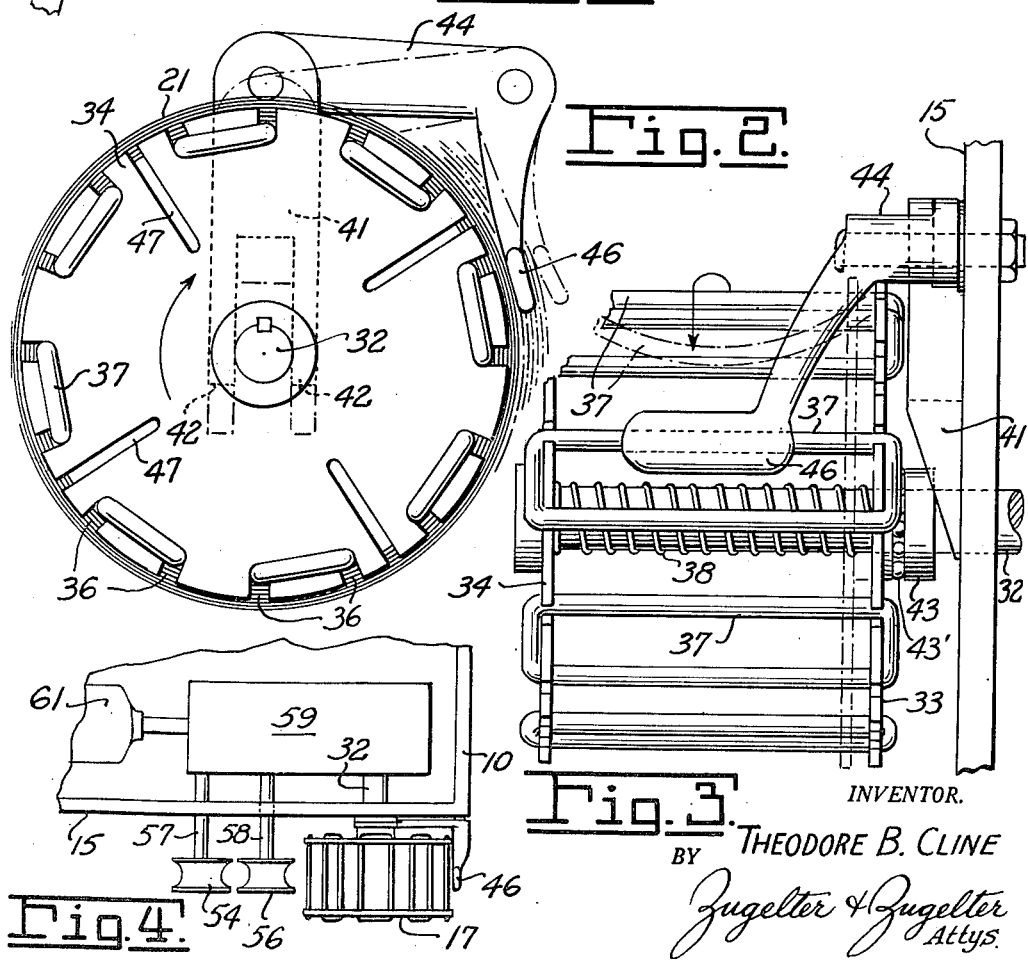
INVENTOR.
THEODORE B. CLINE
BY
Zugelter & Zugelter
Attys.

United States Patent Office 2,706,093
Patented Apr. 12, 1955

2,706,093

SAUSAGE CASING WINDING REEL

Theodore B. Cline, Sycamore Township, Hamilton County, Ohio

Application February 18, 1954, Serial No. 411,154

5 Claims. (Cl. 242—63)

This invention relates to a windup reel, and more particularly to a windup reel which is so constructed that the peripheral speed of the material on the outer layers of the reel will have a substantially constant lineal value. More particularly, this invention relates to a windup reel for a sausage-skinning machine for winding up a sausage casing as the casing is drawn away from skinned sausages.

An object of this invention is to provide a windup reel for filamentary material which is so constructed that, as the material is wound on the reel, the diameter of the reel, as measured to the periphery or outer surface of the material wound on it, will have a substantially constant lineal speed.

Another object of the invention is to provide a windup reel which is so constructed that the effective diameter of the reel, including the layer of material thereon, is decreased as material is wound in layers on the reel, thereby causing the lineal speed of the material on the outer layers to have a substantially constant speed in lineal units as feet per minute.

And a still further object of the invention is to provide a windup reel having a pair of spaced end plates mounted on a reel shaft, the end plates being provided with flexible members spanning the end plates and forming a reel surface on which material is wound, the flexible members and the relatively movable end plates co-acting to provide a substantially constant diameter of reel and layers of material wound on the reel, thereby providing a substantially constant lineal speed at the surface of the material being wound thereon.

The above and other objects and features of the invention will in part be apparent, and will in part be obvious, to those skilled in the art to which it pertains, from the following detailed description and the drawing, in which:

Figure 1 is a view in side elevation showing a sausage-skinning machine equipped with a windup reel constructed in accordance with an embodiment of this invention;

Fig. 2 is an enlarged view in side elevation of the windup reel of the machine illustrated in Fig. 1;

Fig. 3 is a view in end elevation of the windup reel; and

Fig. 4 is a schematic plan view of a portion of the sausage-skinning machine with the cover thereof removed.

As illustrated in Fig. 1, the sausage-skinning machine includes a box-like frame 10 and supporting legs 12. The machine may be mounted on an appropriate support 13 (not shown in detail). The box 10 is closed by a cover 13' when the machine is in use. The frame 10 includes a front face plate 15 on which a roll-supporting frame 16 and a windup reel 17 are mounted. A string of sausages 18 is led into the machine over a large entry roll 18' and passes over the roll-supporting frame 16 and beneath a slitting head assembly 19 which slits casing 21 lengthwise thereof. The slit casing passes over a roll 22 to the windup reel 17.

As shown in Figs. 2 and 3, the windup reel includes an inner end plate or disk 33 and an outer end plate or disk 34. The disks 33 and 34 are keyed to shaft 32 and turn therewith. Each of the disks 33 and 34 is provided with a plurality of pairs of slots 36. The disks 33 and 34 are spanned by flexible ring members 37. The ring members 37 are disposed in the slots. The ring members may be made of neoprene or other similar rubberlike material, or rubber, or other flexible material. The casing is wound on the ring members and the ring members form an open flexible reel rim.

As shown in Fig. 3, a compression spring 38 is mounted on the shaft 32 and urges the disks 33 and 34 apart so that the rings 37 are held in tension. As the casing 21 is wound on the reel, the disk 33 is advanced toward the disk 34 to reduce the tension on the rings 37 and allow the rings 37 to sag inwardly to the position indicated in dot-dash lines. As the rings sag inwardly, the effective diameter of the reel is decreased so that the diameter of the outer layer of the casing on this reel builds up only slowly and the reel can accommodate a thick roll of casing before the thickness becomes sufficient to cause the reel to draw the casing faster than the rotation of the rolls 54 and 56, which drive the sausage beneath the slitting head assembly, can permit.

The disk 33, which is the movable disk, is driven toward stationary disk 34 by a wedge member 41. Wedge member 41 is bifurcated, as shown in Fig. 2, and has end portions 42 which ride on opposite sides of shaft 32. The end portions 42 engage an enlarged hub 43 (see Fig. 3) on the disk 33. The bifurcated end portions are of wedge shape, as shown in Fig. 3, so that, as the member 41 is driven downwardly, hub 43 and movable disk 33 are advanced to the left, as shown in Fig. 3, to relieve the tension on ring members 37.

The member 41 is pivotally connected to an arm of a bell crank 44. The bell crank 44, in turn, is pivotally mounted on the face plate 15. One arm of the bell crank 44 is pivotally connected to the wedge 41. The other arm of the bell crank 44 terminates in a plate-like portion 46. Plate-like portion 46 rides on the casing as the casing is wound on the windup reel. As the thickness of the casing increases, the bell crank swings in a counter-clockwise direction, as shown in Fig. 2, so that, as the casing builds up on the windup reel, the wedge-shaped end portions of member 41 are driven between the face plate 15 and the hub of the movable disk to move the movable disk toward the other disk. As the movable disk is moved, the ring members 37 sag inwardly to reduce the diameter of the portion of the reel upon which the casing winds, so that the peripheral size of the windup reel builds up only at a slow rate. Thus, the pull on the casing caused by reel 17 remains substantially constant and the reel 17 turns at a sufficient speed to wind up the casing without incurring an undue strain on the casing as the casing is wound on the windup reel. As shown in Fig. 3, the hub 43 includes a bearing 43'.

As shown in Fig. 2, the disk 34 is provided with a plurality of knife slots 47. The slots 47 extend radially of the disk 34 from the edge thereof to a point closer to the shaft 32 than the innermost point to which the members 37 can sag. Each of the slots 47 is adapted to receive a knife (not shown). The knife may be inserted into the inner end of one of the slots 47 and can be drawn outwardly through the rolls of casing on the reel to slit the casing and permit ready release of the casing from the windup reel.

The casing is fed to the windup reel 17 from rolls mounted on the roll-supporting frame 16. The roll-supporting frame 16 carries a plurality of rolls 53, 54 and 56. As shown in Fig. 4, rolls 54 and 56 are mounted on shafts 57 and 58, respectively. The shafts 57 and 58 are driven by appropriate gears in a gear box 59. The gears in gear box 59, in turn, are driven by an appropriate electric motor 61. The gears (not shown) of gear box 59 additionally drive the shaft 32 on which reel 17 is mounted, and the relative rates of rotation of the reel 17 and the rolls 54 and 56 is determined by the gearing in the gear box 59 and remain constant.

The rolls 54 and 56 revolve beneath the string of sausages and drive the sausages below the slitting head assembly 19. The windup reel 17 is driven at a sufficient speed to wind up the casing 21 as the casing is discharged from the slitting head assembly, and the speed at which reel 17 turns is sufficient to maintain tension on the casing to help draw the casing away from the sausages of the string.

The windup reel illustrated in the drawing and described above, is subject to structural modification, without departing from the scope of the appended claims.

Having described my invention, what I claim as new, and desire to secure by Letters Patent is:

1. A reel on which material may be wound in layers, embodying for adjusting the diameter of the windings of said material to a substantially constant value, said reel comprising a shaft having relatively movable reel end members thereon, flexible reel-spanning members attached to said end members at spaced points about the shaft to thereby form an open reel rim, means urging said end members in a direction to maintain tension in said spanning members, means for actuating said end members to slacken said spanning members, and means actuated by contact with the surface of the material wound on the reel for actuating said slackening means to thereby maintain the diameter and the lineal speeds of the surface of the material on the reel substantially constant.

2. A sausage casing windup reel for a casing-removing machine which comprises a rotatable shaft, a pair of spaced disks mounted on said shaft to rotate therewith, one of said disks being movable along the shaft, a plurality of flexible members attached to and spanning the disks, spring means urging the disks apart to maintain said flexible members in tension, and means actuated by and in accoradnce with the thickness of the casing on the reel for actuating the movable disk toward the other disk to thereby regulate the diameter of the reel upon which the casing is wound to a substantially constant value, as the reel is turned to wind a casing on the flexible members, whereby the flexible members are adapted to bow inwardly as the casing winds thereon.

3. A casing windup reel in accordance with claim 2, characterized by the fact that the maximum distance of movement of the movable member is insufficient to permit the flexible members to bow inwardly to the shaft, and that at least one of the disks is provided with a slot extending substantially radially thereof from the edge thereof to a point closer to the shaft than the limit of bowing of the flexible members, said slot being adapted to receive a knife for cutting the layers of the casing on the flexible members.

4. A casing windup reel in accordance with claim 2, characterized by the fact that the movable disk has an enlarged hub, that a wedge-shaped driving member engages the hub of the movable disk, that a bell crank is pivotally mounted on the machine adjacent the reel, that one of the arms of the bell crank is connected to the wedge-shaped member, and that the other arm of the bell crank overlies the flexible members of the reel to ride on the casing as the casing builds up on the flexible members, the bell crank swinging as the casing builds up under said other arm to drive the wedge against the hub of the movable disk to permit the flexible members to bow inwardly as the casing builds up thereon.

5. A casing windup reel in accordance with claim 2, characterized by the fact that the movable disk has a hub, and that the means actuated in accordance with the thickness of casing on the reel comprises a wedge-shaped member engageable with the hub of the movable disk, a bell crank having one arm pivotally connected to said wedge-shaped member, and a plate mounted on the other arm of the bell crank and engageable with the casing wrapped on the flexible member, the bell crank swinging in a direction to urge the wedge against the hub when the thickness of the casing under the plate increases to drive the movable disk toward the other disk.

References Cited in the file of this patent

UNITED STATES PATENTS

| | | |
|---|---|---|
| 1,455,195 | Foothrop | May 15, 1923 |
| 2,200,681 | Rollings | May 14, 1940 |
| 2,208,774 | Pierson | July 23, 1940 |